United States Patent
Bhogal et al.

(10) Patent No.: US 7,526,536 B2
(45) Date of Patent: Apr. 28, 2009

(54) SYSTEM AND METHOD FOR PORT ASSIGNMENT MANAGEMENT ACROSS MULTIPLE NODES IN A NETWORK ENVIRONMENT

(75) Inventors: Kulvir Singh Bhogal, Fort Worth, TX (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 11/104,320

(22) Filed: Apr. 12, 2005

(65) Prior Publication Data

US 2006/0230126 A1    Oct. 12, 2006

(51) Int. Cl.
*G06F 15/177* (2006.01)
*G06F 15/16* (2006.01)

(52) U.S. Cl. .................................. 709/220; 709/227
(58) Field of Classification Search ................. 709/220
See application file for complete search history.

(56) References Cited

U.S. PATENT DOCUMENTS

| | | | |
|---|---|---|---|
| 6,009,474 A | 12/1999 | Lu et al. ..................... 709/245 |
| 6,014,715 A | 1/2000 | Stoevhase .................... 710/11 |
| 6,507,873 B1 | 1/2003 | Suzuki et al. ............... 709/245 |
| 6,883,034 B1* | 4/2005 | Pelavin et al. ............... 709/242 |
| 2002/0052960 A1 | 5/2002 | Trisno et al. ................. 709/226 |
| 2002/0091855 A1 | 7/2002 | Yemini et al. ................ 709/238 |
| 2002/0163889 A1 | 11/2002 | Yemini et al. ................ 370/238 |
| 2002/0178265 A1* | 11/2002 | Aiken et al. ................. 709/227 |
| 2003/0051014 A1 | 3/2003 | Gluska et al. ................ 709/222 |
| 2003/0101282 A1 | 5/2003 | White, III et al. ........... 709/245 |
| 2004/0057443 A1 | 3/2004 | Kim et al. .................... 370/401 |
| 2006/0056293 A1* | 3/2006 | Kumagai et al. ............ 370/229 |

FOREIGN PATENT DOCUMENTS

| | | |
|---|---|---|
| JP | 4-317156 | 7/1992 |
| WO | WO 02/11400 A1 | 2/2002 |

* cited by examiner

*Primary Examiner*—Jeffrey Pwu
*Assistant Examiner*—Shaq Taha
(74) *Attorney, Agent, or Firm*—Yee & Associates, P.C.; Diana R. Gerhardt

(57) ABSTRACT

A method, computer program product, and a data processing system for detecting port assignment conflicts in a network data processing system is provided. Additionally, a mechanism for automatically resolving port assignment conflicts in response to detecting such conflicts is provided. A first data processing system receives configuration data of a second data processing system in the network. The configuration data describes port assignments maintained by the second data processing system. The first data processing system evaluates the configuration data for conflicts in the port assignments. Reconfigured port assignments for the second data processing system are then generated, and a directive is issued to the second data processing system to reconfigure the port assignments.

3 Claims, 5 Drawing Sheets

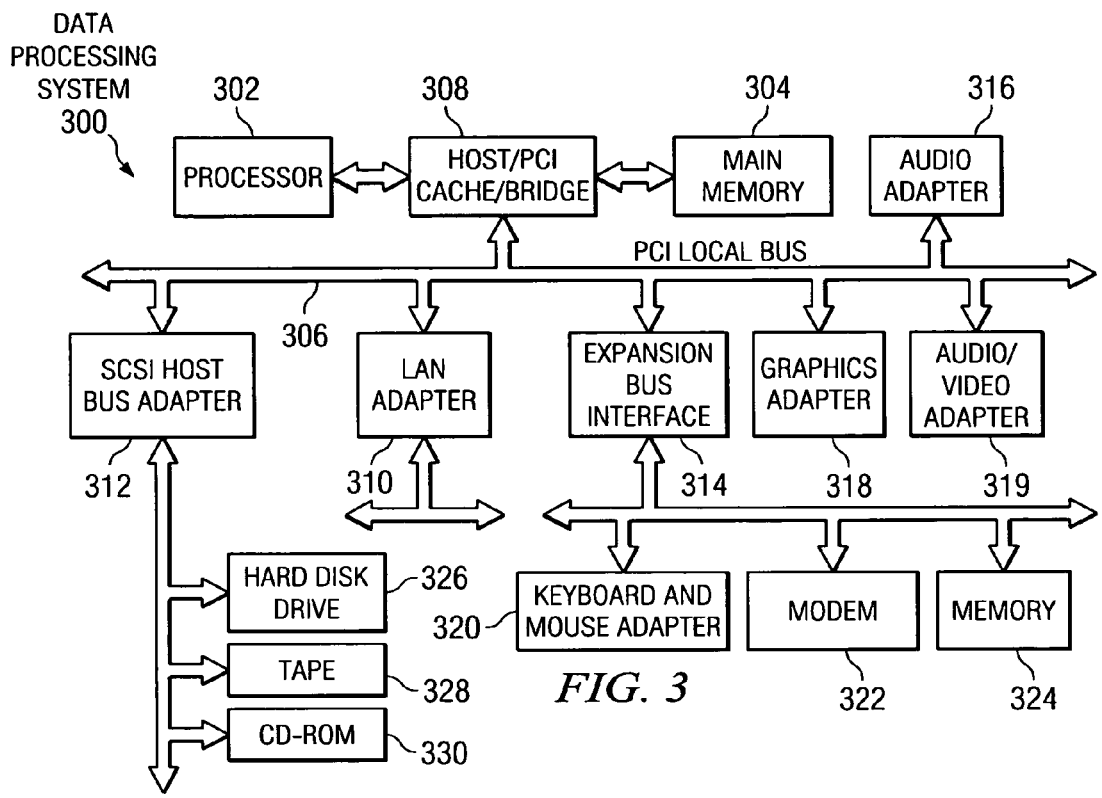
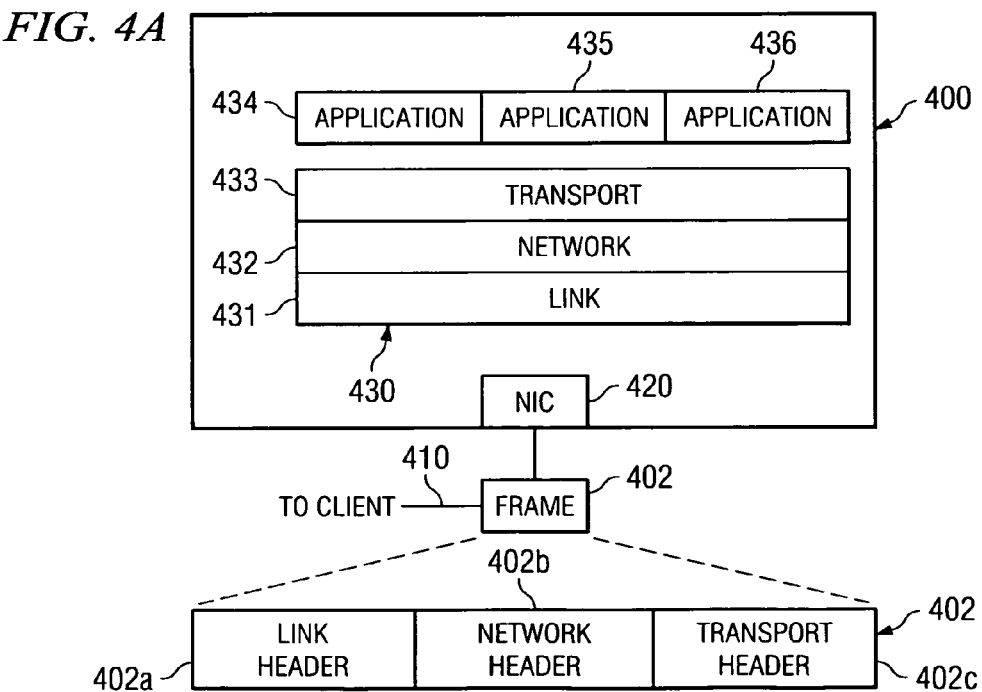

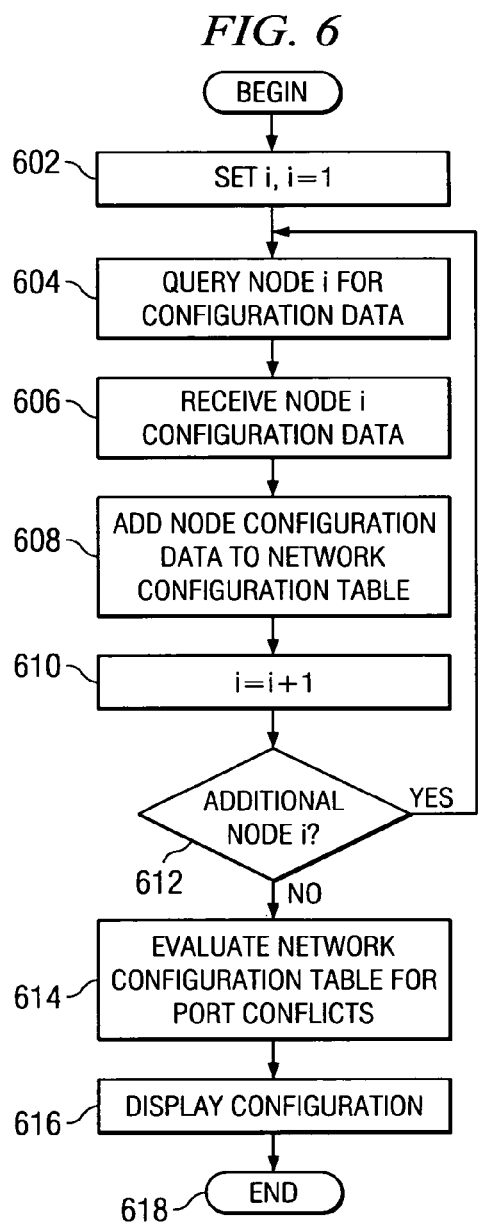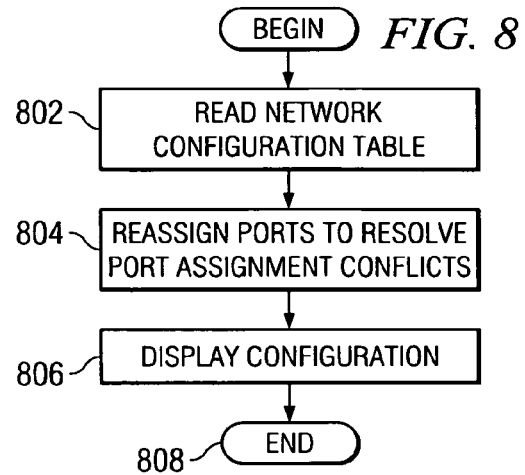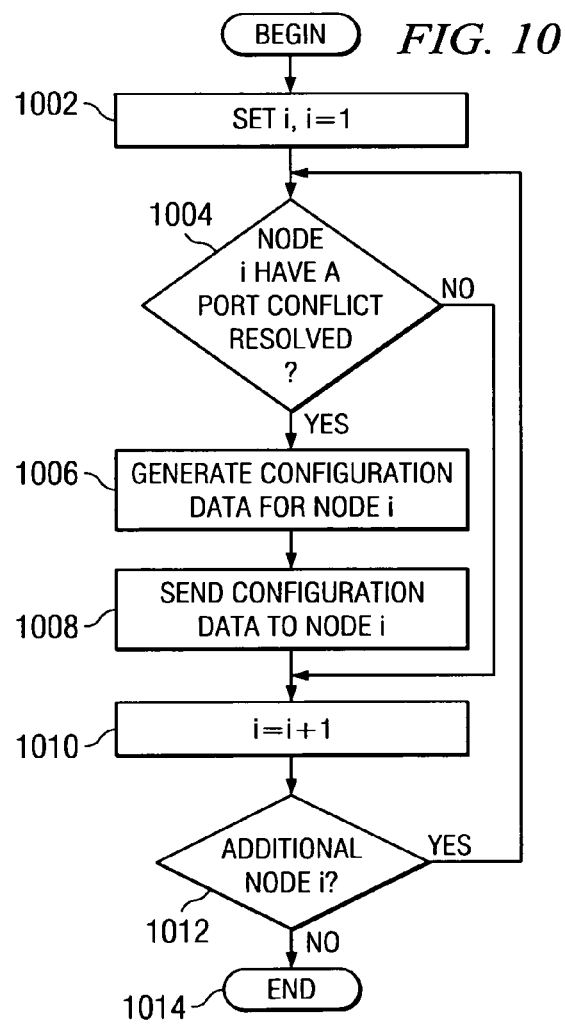

| | 700 | |
|---|---|---|
| IP (710) | PORT (711) | APPLICATION (712) |
| X | A | 1 |
| X | B | 2 |
| X | A | 3 |
| Y | C | 4 |
| Y | D | 5 |
| Y | D | 6 |

Rows: 701, 702, 703, 704, 705, 706

*FIG. 7*

| | 900 | |
|---|---|---|
| IP (910) | PORT (911) | APPLICATION (912) |
| X | A | 1 |
| X | B | 2 |
| X | E | 3 |
| Y | C | 4 |
| Y | D | 5 |
| Y | F | 6 |

Rows: 901, 902, 903, 904, 905, 906

*FIG. 9*

SYSTEM AND METHOD FOR PORT ASSIGNMENT MANAGEMENT ACROSS MULTIPLE NODES IN A NETWORK ENVIRONMENT

BACKGROUND OF THE INVENTION

1. Technical Field

The present invention relates generally to an improved data processing system and, in particular, to a mechanism for managing port assignments across multiple nodes in a network of data processing systems. Still more particularly, the present invention provides a mechanism for identifying port assignment conflicts and for facilitating correction of port assignment conflicts in a data processing system network.

2. Description of Related Art

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, application data, etc.).

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Nodes deployed in the Internet typically utilize layered protocols that facilitate processing of different facets of node-to-node communications. For example, in systems employing the transport control protocol/Internet protocol (TCP/IP), a network stack features a link layer, network layer, transport layer, and an application layer. In the TCP/IP protocol suite, the transport layer manages the flow of data between two hosts, e.g., a client and server, for the application layer. To this end, the transport layer includes a port designation, e.g., a 16-bit port number, for distinguishing which application to direct data to (or from). Data received at the transport layer of the network stack is demultiplexed and conveyed to a particular application based on a destination port number read from the TCP header.

In large enterprise environments with many application servers, port assignments may become conflicted. That is, multiple applications may be deployed in a network that listen for data on a common port. In such situations, one or more of the applications assigned the port number may fail. Typically, the latter application assigned a duplicative port number will be non-functional. Conventionally, conflicted port assignments must be resolved through manual intervention—a time consuming and tedious process.

It would be advantageous to provide a mechanism for detecting port assignment conflicts in a network data processing system. It would be further advantageous to provide a mechanism for automatically resolving port assignment conflicts in response to detecting such conflicts.

SUMMARY OF THE INVENTION

The present invention provides a method, computer program product, and a data processing system for detecting port assignment conflicts in a network data processing system. Additionally, a mechanism for automatically resolving port assignment conflicts in response to detecting such conflicts is provided. A first data processing system receives configuration data of a first node in the network. The configuration data describes port assignments maintained by the first node. The first data processing system evaluates the configuration data for conflicts in the port assignments. Reconfigured port assignments for the first node are then generated, and a directive is issued to the first node to reconfigure the port assignments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system that may be implemented as a client in accordance with a preferred embodiment of the present invention;

FIG. 4A is a diagrammatic illustration of a server configuration for supplying application services to clients in accordance with a preferred embodiment of the present invention;

FIG. 6 is a flowchart of a port conflict detection routine implemented in accordance with a preferred embodiment of the present invention;

FIG. 7 is a diagrammatic illustration of a network configuration table generated by the port conflict detection routine described in FIG. 6 in accordance with a preferred embodiment of the present invention;

FIG. 8 is a flowchart of a port reassignment routine for resolving port conflicts in accordance with a preferred embodiment of the present invention;

FIG. 9 is a diagrammatic illustration of a reconfigured network configuration table generated by the port reassignment routine depicted in FIG. 8 in accordance with a preferred embodiment of the present invention; and FIG. 10 is a flowchart of a port reassignment directive routine for conveying port reassignments to network nodes that have had port conflicts resolved by the port reassignment routine depicted in FIG. 8 in accordance with a preferred embodiment of the present invention.

DETAILED DESCRIPTION OF THE PREFERRED EMBODIMENT

Figure 1:
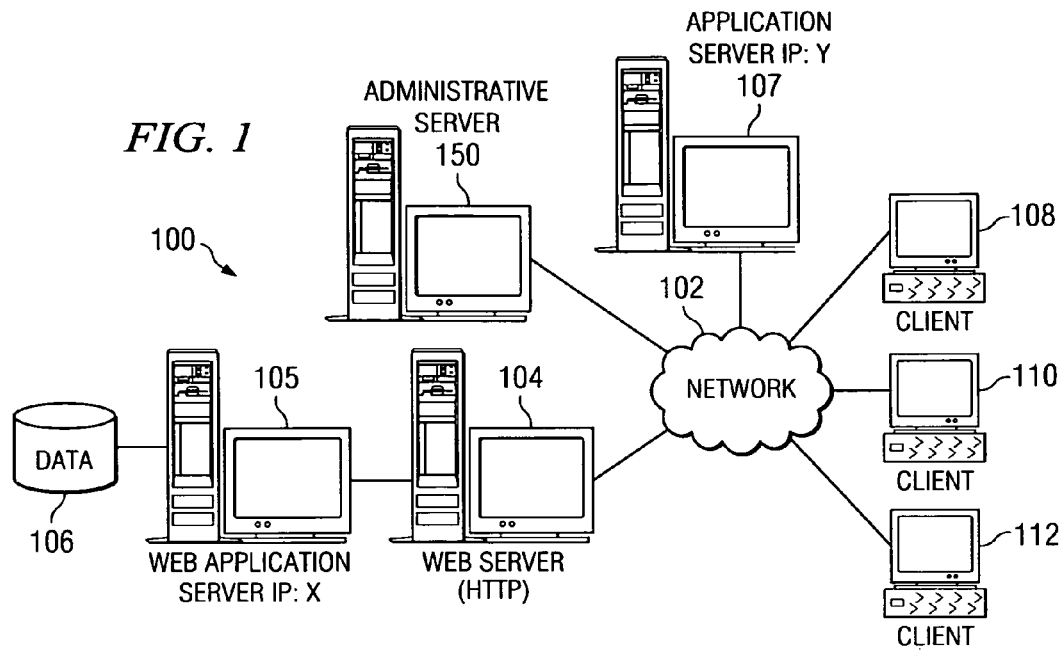
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, web server 104 is connected to network 102. In addition, clients 108, 110, and 112 are connected to network 102. These clients 108, 110, and 112 may be, for example, personal computers or network computers. In the depicted example, web server 104 may be implemented as an HTTP server that sends web pages to clients 108-112 responsive to receiving an HTTP request from, for example, browsers running on clients 108-112. Additionally, web server 104 may provide data other than HTTP data, such as applications, to clients 108-112. Clients 108, 110, and 112 are clients to web server 104. Web server 104 interfaces and communicates with web application server 105. Web application server 105 handles application operations between browser-issued requests issued by clients 108-112 and back end applications maintained by data store 106 that interfaces with web application server 105. In a similar manner, web application server 107 connects with network 102 and provides applications to clients 108-112. Additionally, an administrator data processing system 150 is connected with network 102 for detection and resolution of port assignment conflicts in accordance with embodiments of the present invention as described more fully hereinbelow.

Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
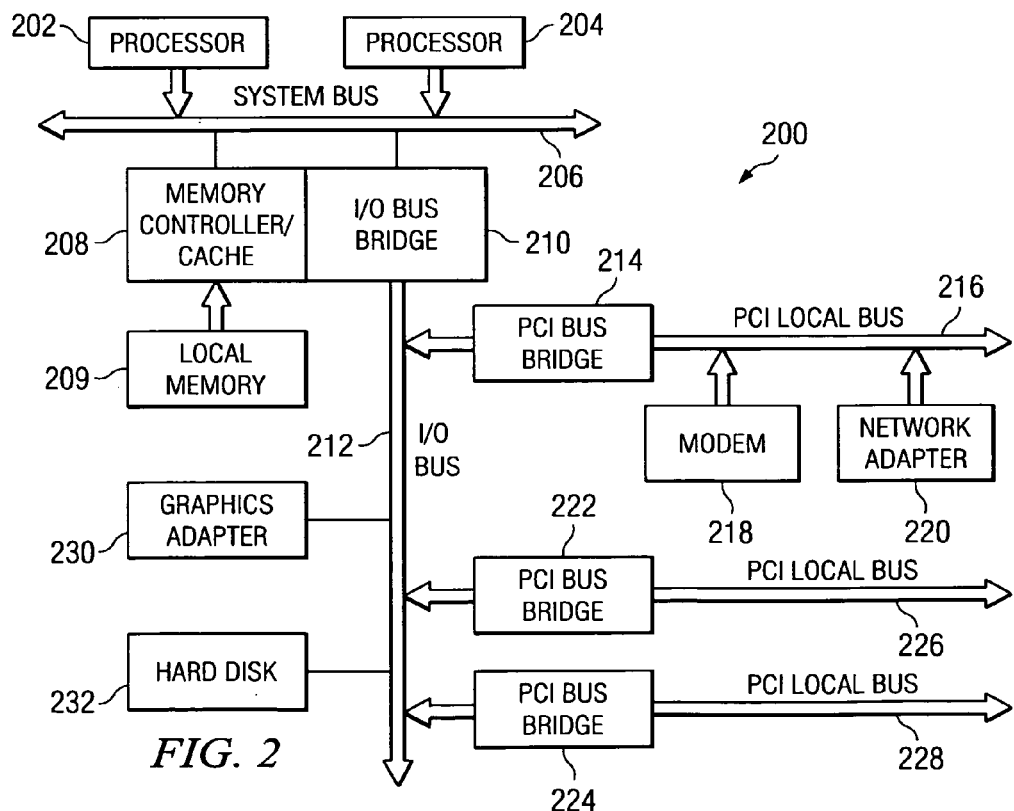
FIG. 2 is a block diagram of a data processing system that may be implemented as a server in accordance with a preferred embodiment of the present invention.

Referring to FIG. 2, a block diagram of a data processing system that may be implemented as a server, such as web application server 105 and 107 in FIG. 1, is depicted in accordance with a preferred embodiment of the present invention. Data processing system 200 may be a symmetric multiprocessor (SMP) system including a plurality of processors 202 and 204 connected to system bus 206 although other multi-processor configurations may be suitably substituted therefor. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N. Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer, such as client 108 shown in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

A client, such as client 108, initiates a communication connection with a web application server, such as web application server 107. In the illustrative examples provided herein, communication connections between a client and server are described with reference to the TCP/IP protocol suite, although other communication protocols may be suitably substituted therefor. Implementations of the present invention are not limited to any particular protocol and those described are provided only to facilitate an understanding of the invention.

Figure 4B:
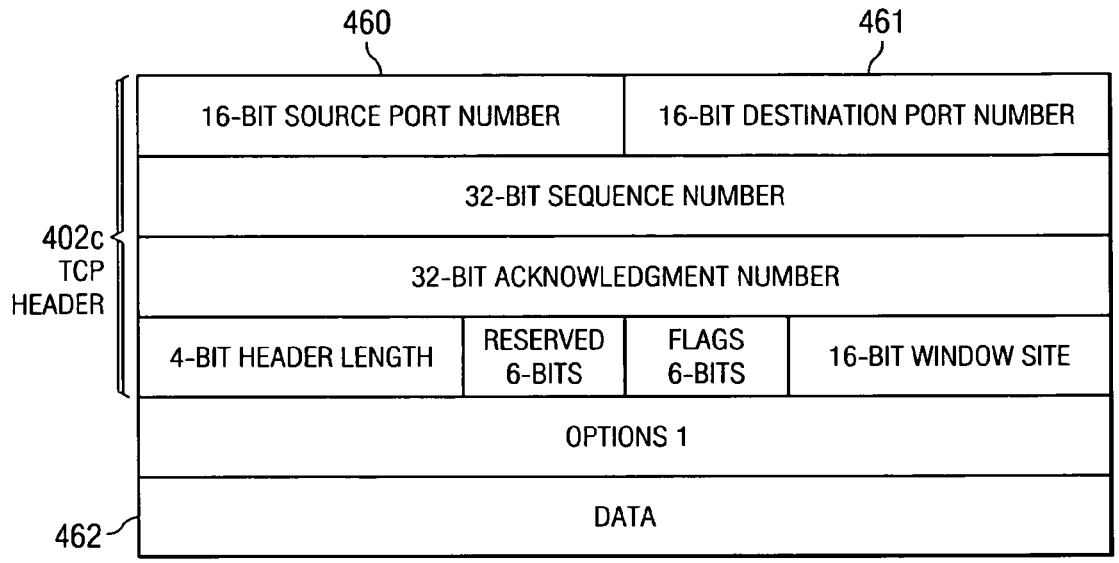
FIG. 4B is a diagrammatic illustration of a conventional transport control protocol header that identifies a port that facilitates application data flow in accordance with a preferred embodiment of the present invention.

FIG. 4A is a diagrammatic illustration of a server configuration for supplying application services to clients in accordance with a preferred embodiment of the present invention. Server 400 is an example of a network server, such as web application server 105 or 107, deployed in a network data processing system 100 shown in FIG. 1. A client, such as client 108, will initiate a communication connection with server 400 by first engaging in a handshake with server 400. To establish a connection, a client addresses frame 402 to server 400 and applies frame 402 to network media 410, e.g., a 10baseT, 100baseT, or other suitable network media. Frame 402 comprises various encapsulated headers. In the present example, the client and server connect over the Internet and thus frame 402 comprises a link header 402a, e.g., an Ethernet header, network layer header 402b, e.g., an IP header, and transport layer header 402c, e.g., a TCP header. For example, frame 402 may encapsulate a synchronization (SYN) segment comprising transport layer header 402c having an asserted SYN flag for initiating a handshake with server 400. Server 400 receives frame 402 via network interface card 420, e.g., an Ethernet card, that conveys the frame to link layer 431, e.g., an Ethernet driver, of network stack 430. Link layer 431 decapsulates, or demultiplexes, the IP datagram from the frame and passes the IP datagram to network layer 432 of network stack 430. Network layer 432 demultiplexes the TCP segment from the IP datagram and passes the TCP segment to transport layer 433 of network stack 430. FIG. 4B shows a conventional TCP header, such as TCP header 402c of frame 402 shown in FIG. 4A. As can be seen, a source port number and a destination port number are defined in respective fields 460 and 461 of TCP header 402c.

Once a connection is established, the client and server may exchange application data. In accordance with the TCP/IP protocol, the TCP layer handles application data flow according to applications and corresponding ports respectively assigned thereto.

In the illustrative example of FIG. 4A, server 400 runs applications 434-436 and a client, such as client 108 shown in FIG. 1, may supply application data to server 400 that is to be processed by one of applications 434-436. The TCP layer of the network stack manages the flow of application data by evaluating the destination port number of frames received by server 400.

Figure 5A:
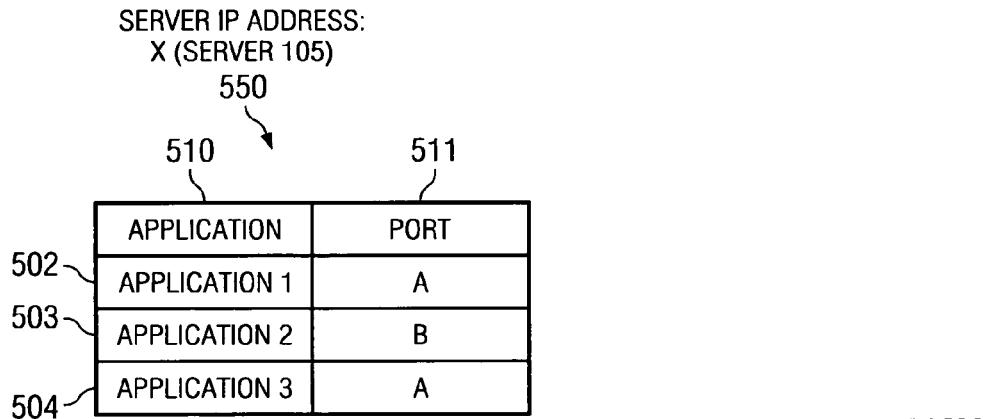
FIGS. 5A and 5B are exemplary port assignment records that may be maintained by a respective network node and that are utilized for detecting port assignment conflicts in accordance with a preferred embodiment of the present invention.

FIG. 5A is an exemplary port assignment record that may be maintained by a network node and that is utilized for detecting port assignment conflicts in accordance with a preferred embodiment of the present invention. Table 550 is an exemplary data structure that defines application port assignments maintained by a network node, such as server 105 shown in FIG. 1. Table 550 is preferably implemented as a set of instructions that a processing unit of a data processing system fetches from a memory. In the illustrative example, table 550 defines port assignments of three applications (application 1-application 3). Particularly, records 502-504 define an application and a corresponding port assigned thereto in application field 510 and port field 511, respectively. In the illustrative example, records 502-504 respectively define port assignments of A, B, and A for applications 1-3.

Figure 5B:
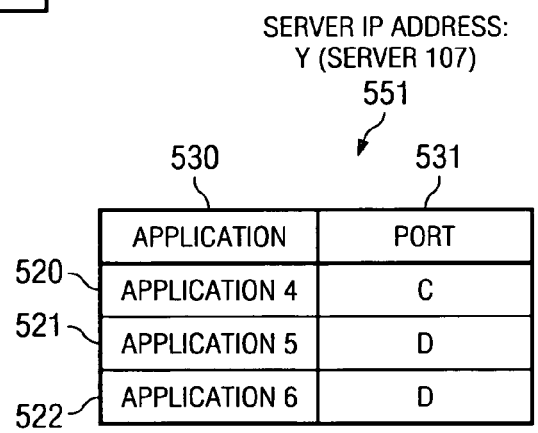

For illustrative purposes, assume that web application server 105 (having IP address "X") shown in FIG. 1 provides application services associated with applications 1-3 and is configured with the port assignments defined by port assignment table 550 shown in FIG. 5A. Also assume that web application server 107 (having IP address "Y") runs applications 4-6 and is configured with port assignment table 551 shown in FIG. 5B. That is, application server 107 maintains port assignment table 551 in a memory thereof and a transport layer of a network stack run by application server 107 manages application data flow per the port assignments shown in FIG. 5B. Thus, in the configuration shown, application server 107 has applications 4-6 configured with respective port assignments of C, D, and D.

In the present example, an intra-node port conflict exists on application server 105. As referred to herein, an intra-node port conflict is a conflict of port assignments on a single node, for example assignment of two or more applications maintained by a server to a common port. In the illustrative example, application server 105 has both application 1 and application 3 assigned to port A and thus has an intra-node port conflict. Thus, one (or both) of applications 1 and 3 will fail to execute properly and may receive data intended for another application. Additionally, an intra-node port conflict exists on application server 107. Application server 107 has both applications 5 and 6 assigned to port D and thus has an intra-node port conflict.

In accordance with a preferred embodiment of the present invention, an administrative server, such as administrative server 150 deployed in network data processing system 100 shown in FIG. 1, periodically queries network nodes that provide application services to clients or others servers within the network. Querying of network nodes may be performed responsive to an administrator invocation of a port configuration routine run by administrative server 150 or may automatically be invoked, for example at predefined intervals.

FIG. 6 is a flowchart of a port conflict detection routine implemented in accordance with a preferred embodiment of the present invention. The port conflict detection routine is preferably implemented as a set of computer-readable instructions that is fetched from memory and executed by a processing unit of an administrative server, such as administrative server 150 shown in FIG. 1. The port conflict detection routine may be implemented as a subroutine of a port configuration application. A command provided by an administrator or an automatic invocation at a predefined interval invokes the routine and initializes an index i (step 602). For example, a list of network nodes each sequentially enumerated and corresponding network addresses may be maintained by the administrative server. The administrative server then queries the nodes by cycling through the list of network nodes. Alternatively, the administrative server may select a network node to be queried by cycling through a list of network node addresses or by another suitable mechanism.

Once a network node i is selected or indexed, the routine then queries the network node i for configuration data (step 604). Node i returns configuration data to the administrative server (step 606), and the administrative server adds the configuration data of the node to a network configuration table or other data structure (step 608). The administrative server then increments the node index i (step 610), and determines if additional network nodes remain for evaluation (step 612). If an additional network node i remains for evaluation of port assignment conflicts, the port conflict detection routine returns to step 604 to query the node i for configuration data.

Returning again to step 612, if it is determined that no additional nodes remain for evaluation, the administrative server evaluates the network configuration table for port conflicts (step 614). The administrative server optionally displays the configuration data for evaluation by an administrator (step 616), and the port conflict detection routine then exits (step 618).

FIG. 7 is a diagrammatic illustration of a network configuration table generated by the port conflict detection routine described above in FIG. 6 in accordance with a preferred embodiment of the present invention. Particularly, network configuration table 700 is an exemplary data structure generated from configuration data returned to an administrative server as described above in step 608 of FIG. 6. Network configuration table 700 comprises records 701-706 that each define port assignments to applications at each node queried by the port conflict detection routine. In the illustrative example, each record of network configuration table 700 includes a node identifier, a port, and a corresponding application to which the port is assigned. The node identifier may comprise, for example, a network address of the node. For example, field 710 includes IP addresses of nodes queried by the port conflict detection routine. The administrative server records ports of the node identified in field 710 in port field 711, and corresponding identifiers of applications to which the ports are assigned are recorded in application field 712.

The port conflict detection routine may identify intra-node port conflicts by evaluating port values for records having a common node identifier. For example, the port conflict detection routine may identify a port conflict at the network node having an IP address "X" by comparing the port values in field 711 of records 701-703. In this instance, a port conflict is identified between applications 1 and 3 that are both assigned port values "A." In a similar manner, an intra-node port conflict on the node having an IP address "Y" is identified by comparing the port values in field 711 of records 704-706. In this instance, a port conflict is identified between applications 5 and 6 that are both assigned port values of "D."

FIG. 8 is a flowchart of a port reassignment routine for resolving port conflicts in accordance with a preferred embodiment of the present invention. The port reassignment routine is preferably implemented as a set of computer-readable instructions that are fetched from memory and executed by a processing unit of an administrative server, such as administrative server 150 shown in FIG. 1.

The port reassignment routine is invoked, for example on completion of the conflict detection routine depicted in FIG. 6 or by invocation of an administrator. The port reassignment routine begins by reading the network configuration table and a port conflicts record (step 802). For example, a record of port conflicts may be generated by the port conflict detection routine described above in FIG. 6 upon detection of any port conflicts, and the port conflicts record is read along with the network configuration table by the port reassignment routine. Ports are then reassigned to resolve port conflicts (step 804). For example, the port reassignment routine may have (or interface with) a record of available ports that have yet to be assigned. A port that has been assigned in conflict with another port assignment is then set to one of the available port values. The results may then be optionally displayed (step 806), for example for review by an administrator. The port reassignment routine then exits (step 808).

FIG. 9 is a diagrammatic illustration of a reconfigured network configuration table generated by the port reassignment routine depicted in FIG. 8 in accordance with a preferred embodiment of the present invention. Reconfigured network configuration table 900 comprises records 901-906 that each define port assignments to applications at each node queried by the port conflict detection routine. In the illustrative example, each record of reconfigured network configuration table 900 includes a node identifier, a port, and a corresponding application to which the port is assigned. In the illustrative example, the intra-node port conflict of server 105 (having IP address "X") identified by the port conflict detection routine as described above has been resolved by reassigning application 3 run on server 105 to a value of "E" as can be seen in record 903 of reconfigured network configuration table 900. Additionally, the intra-node port conflict of server 107 (having IP address "Y") identified by the port conflict detection routine as described above has been resolved by reassigning application 6 run on server 107 to a value of "F" as can be seen in record 906 of reconfigured network configuration table 900. FIG. 10 is a flowchart of a port reassignment directive routine for conveying port reassignments to network nodes that have had port conflicts resolved by the port reassignment routine depicted in FIG. 8 in accordance with a preferred embodiment of the present invention. The port reassignment directive routine is preferably implemented as a set of computer-readable instructions that are fetched from memory and executed by a processing unit of an administrative server, such as administrative server 150 shown in FIG. 1.

The port reassignment directive routine begins, for example on invocation by an administrator or on completion of the port reassignment routine depicted in FIG. 8, and initializes a node index i (step 1002). An evaluation of the currently indexed node is made to determine if the node had a port assignment conflict resolved by the port reassignment routine depicted in FIG. 8 (step 1004). If the currently indexed node did not have a port conflict resolved by the port reassignment routine, the port reassignment directive routine proceeds to increment the node index (step 1010).

Returning again to step 1004, if the currently indexed node is identified as having had a port conflict resolved by the port reassignment routine, the port reassignment directive routine proceeds to generate configuration data for the currently indexed node (step 1006). For example, the configuration data generated for the currently indexed node may be retrieved from the reconfigured network configuration table shown in FIG. 9 by selecting the records having the address of the currently indexed node. The configuration data generated for the currently indexed node is then sent to the node (step 1008), and the port reassignment directive routine then increments the node index according to step 1010. An evaluation is then made to determine if an additional node remains in the network (step 1012). If an additional node remains in the network, the port reassignment directive routine returns to step 1004 to determine if the node has had a port conflict resolved. Alternatively, if no additional nodes remain in the network, the port reassignment directive routine then exits (step 1014).

As described, embodiments of the present invention provide a mechanism for detecting port assignment conflicts in a network data processing system. Additionally, a mechanism for automatically resolving port assignment conflicts in response to detecting such conflicts is provided. An administrative data processing system receives configuration data of a first node in the network. The configuration data describes port assignments maintained by the first node. The administrative data processing system evaluates the configuration data for conflicts in the port assignments. reconfigured port assignments for the first node are then generated, and a directive is issued by the administrative data processing system to the first node to reconfigure the port assignments.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of resolving port conflicts between multiple applications assigned to a common port in a data processing system network, the method comprising the computer implemented steps of:

generating, by an administrative data processing system, a data structure that was received by each one of a plurality of server data processing systems in the network, wherein the data structure stores configuration data of each one of the plurality of server data processing systems, wherein the configuration data describes existing TCP port assignments currently maintained by each one of the plurality of server data processing systems, and further wherein the configuration data includes an IP address of each one of the plurality of server data processing systems, identifiers of a plurality of applications run by each one of the plurality of server data processing systems, and port identifiers of TCP ports respectively assigned to each of the plurality of applications, and still further wherein each one of the plurality of server data processing systems is identified using a different IP address;

responsive to receiving the configuration data from each one of the plurality of server data processing systems, evaluating, by the administrative data processing system, all configuration data stored in the data structure for a conflict in the existing TCP port assignments for each one of the plurality of server data processing systems, wherein a conflict comprises a plurality of applications being run by one of the plurality of server data processing systems that are commonly assigned to the same TCP port in the one of the plurality of server data processing systems;

identifying, by the administrative data processing system, a first application and a second application of at least one particular one of the plurality of server data processing systems concurrently assigned to a first TCP port of the at least one particular one of the plurality of server data processing systems, wherein a conflict currently exists in the at least one particular one of the plurality of server data processing systems;

reconfiguring, by the administrative data processing system, TCP port assignments for the at least one particular one of the plurality of server data processing systems, wherein reconfiguring the TCP port assignments further comprises assigning a second TCP port to one of the first application and the second application; and for the at least one particular one of the plurality of server data processing systems, responsive to reconfiguring the TCP port assignments:

generating, by the administrative data processing system, new configuration data for the at least one particular one of the plurality of server data processing systems, wherein the new configuration data includes the reconfigured TCP port assignments for the at least one particular one of the plurality of server data processing systems;

sending, by the administrative data processing system, the new configuration data to the at least one particular one of the plurality of server data processing systems; and issuing, by the administrative data processing system, a directive to the at least one particular one of the plurality of server data processing systems, wherein the directive comprises instructions for the at least one particular one of the plurality of server data processing systems to reconfigure the TCP port assignments maintained by the at least one particular one of the plurality of server data processing systems in accordance with the reconfigured TCP port assignments.

2. A computer program product that is stored in a computer-recordable medium for resolving port conflicts between multiple applications assigned to a common port in a data processing system network, the computer program product comprising:

instructions for generating, by an administrative data processing system, a data structure that was received by each one of a plurality of server data processing systems in the network, wherein the data structure stores configuration data of each one of the plurality of server data processing systems, wherein the configuration data describes existing TCP port assignments cunently maintained by each one of the plurality of server data processing systems, and further wherein the configuration data includes an IP address of each one of the plurality of server data processing systems, identifiers of a plurality of applications run by each one of the plurality of server data processing systems, and port identifiers of TCP ports respectively assigned to each of the plurality of applications, and still further wherein each one of the plurality of server data processing systems is identified using a different IP address;

responsive to receiving the configuration data from each one of the plurality of server data processing systems, instructions for evaluating, by the administrative data processing system, all configuration data stored in the data structure for a conflict in the existing TCP port assignments for each one of the plurality of server data processing systems, wherein a conflict comprises a plurality of applications being run by one of the plurality of server data processing systems that are commonly assigned to the same TCP port in the one of the plurality of server data processing systems;

instructions for identifying, by the administrative data processing system, a first application and a second application of at least one particular one of the plurality of server data processing systems concurrently assigned to a first TCP port of the at least one particular one of the plurality of server data processing systems, wherein a conflict currently exists in the at least one particular one of the plurality of server data processing systems;

instructions for reconfiguring, by the administrative data processing system, TCP port assignments for the at least one particular one of the plurality of server data processing systems, wherein reconfiguring the TCP port assignments further comprises assigning a second TCP port to one of the first application and the second application; and for the at least one particular one of the plurality of server data processing systems, responsive to the instructions for reconfiguring the TCP port assignments:

instructions for generating, by the administrative data processing system, new configuration data for the at least one particular one of the plurality of server data processing systems, wherein the new configuration data includes the reconfigured TCP port assignments for the at least one particular one of the plurality of server data processing systems;

instructions for sending, by the administrative data processing system, the new configuration data to the at least one particular one of the plurality of server data processing systems; and instructions for issuing, by the administrative data processing system, a directive to the at least one particular one of the plurality of server data processing systems, wherein the directive comprises instructions for the at least one particular one of the plurality of server data processing systems-to reconfigure the TCP port assignments maintained by the at least one particular one of the plurality of server data processing systems in accordance with the reconfigured TCP port assignments.

3. A data processing system for resolving port conflicts between multiple applications assigned to a common port in a data processing system network, comprising:

a memory that contains a port conflict detection and resolution routine as a set of instructions; and a processing unit, responsive to the set of instructions, that:

generates, by an administrative data processing system, a data structure that was received by each one of a plurality of server data processing systems in the network, wherein the data structure stores configuration data of each one of the plurality of server data processing systems, wherein the configuration data describes existing TCP port assignments currently maintained by each one of the plurality of server data processing systems, and further wherein the configuration data includes an IP address of each one of the plurality of server data processing systems, identifiers of a plurality of applications run by each one of the plurality of server data processing systems, and port identifiers of TCP ports respectively assigned to each of the plurality of applications, and still further wherein each one of the plurality of server data processing systems is identified using a different IP address;

responsive to receiving the configuration data from each one of the plurality of server data processing systems, evaluates, by the administrative data processing system, all configuration data stored in the data structure for a conflict in the existing TCP port assignments for each one of the plurality of server data processing systems, wherein a conflict comprises a plurality of applications being run by one of the plurality of server data processing systems that are commonly assigned to the same TCP port in the one of the plurality of server data processing systems;

identifies, by the administrative data processing system, a first application and a second application of at least one particular one of the plurality of server data processing systems concurrently assigned to a first TCP port of the at least one particular one of the plurality of server data processing systems, wherein a conflict currently exists in the at least one particular one of the plurality of server data processing systems;

reconfigures, by the administrative data processing system, TCP port assignments for the at least one particular one of the plurality of server data processing systems, wherein reconfiguring the TCP port assignments further comprises assigning a second TCP port to one of the first application and the second application; and for the at least one particular one of the plurality of server data processing systems, responsive to reconfiguring the TCP port assignments:

generates, by the administrative data processing system, new configuration data for the at least one particular one of the plurality of server data processing systems, wherein the new configuration data includes the reconfigured TCP port assignments for the at least one particular one of the plurality of server data processing systems;

sends, by the administrative data processing system, the new configuration data to the at least one particular one of the plurality of server data processing systems; and issues, by the administrative data processing system, a directive to the at least one particular one of the plurality of server data processing systems, wherein the directive comprises instructions for the at least one particular one of the plurality of server data processing systems-to reconfigure the TCP port assignments maintained by the at least one particular one of the plurality of server data processing systems in accordance with the reconfigured TCP port assignments.

* * * * *